(12) United States Patent
Graells et al.

(10) Patent No.: US 9,097,535 B2
(45) Date of Patent: Aug. 4, 2015

(54) PUBLIC TRANSPORTATION JOURNEY PLANNING

(75) Inventors: Albert Graells, Zurich (CH); Lucien Pech, Zurich (CH)

(73) Assignee: Google Inc., Mountain View, CA (US)

( * ) Notice: Subject to any disclaimer, the term of this patent is extended or adjusted under 35 U.S.C. 154(b) by 251 days.

(21) Appl. No.: 13/467,361

(22) Filed: May 9, 2012

(65) Prior Publication Data

US 2013/0304378 A1 Nov. 14, 2013

(51) Int. Cl.
*G01C 21/00* (2006.01)
*G01C 21/20* (2006.01)
*G01C 22/00* (2006.01)

(52) U.S. Cl.
CPC ............... *G01C 21/20* (2013.01); *G01C 21/00* (2013.01); *G01C 22/00* (2013.01)

(58) Field of Classification Search
CPC .......... G01C 22/00; G01C 21/00; G01C 21/20
See application file for complete search history.

(56) References Cited

U.S. PATENT DOCUMENTS

| 7,957,871 | B1 | 6/2011 | Echeruo |
| 8,417,409 | B2* | 4/2013 | Bast et al. ............... 701/25 |
| 2011/0098908 | A1* | 4/2011 | Chun .................... 701/117 |
| 2011/0112759 | A1 | 5/2011 | Bast et al. |

OTHER PUBLICATIONS

Ferris, "OneBusAway: Improving the Usability of Public Transit", University of Washington, 2011, pp. 1-218, [retrieved on Oct. 10, 2013}. Retrieved from the Internet <URL: http://dub.washington.edu/djangosite/media/papers/ferris-dissertation.pdf>.
Kinder, "Models for Periodic Timetabling", Technishe Universite Berlin, May 15, 2008, pp, 1-92 [retrieved on Oct. 10, 2013]. Retrieved from the Internet <URL: http://opus4.kobv.de/opus4-zib/frontdoor/index/index/docid/1088>.
International Search Report—2 pages.
Bast et al., "Fast Routing in Very Large Public Transportation Networks Using Transfer Patterns", extended online version of ESA'10 Paper with same title, modified Jul. 6, 2010—16 pages.

* cited by examiner

*Primary Examiner* — John Q Nguyen
*Assistant Examiner* — Michael Kerrigan
(74) *Attorney, Agent, or Firm* — Dority & Manning, P.A.

(57) ABSTRACT

A public transportation journey planning system and method provides transit graph data from which routes can be selected using a route searching technique, for vehicle schedules that are not defined in terms of actual arrival and departure times at stations but rather in terms of a repeat schedule having common repeat period (P) for successive vehicles between start and end times of the day.

14 Claims, 5 Drawing Sheets

PUBLIC TRANSPORTATION JOURNEY PLANNING

FIELD

This invention relates public transportation journey planning.

BACKGROUND

Public transport journey planning systems have been developed which allow travellers to plan their route on public transportation systems between selected start and end destinations, taking into account a selected start time or arrival time for the journey.

The journey may involve the use of more than one transport route, for example different train lines, bus routes or ferries and may involve a transit from a particular station or stop to a different vehicle running on a different route, which may involve walking to accomplish a transit between the routes.

Hitherto, published schedules of train, bus and other public transportation departure and arrival times for individual stations or stops, hereinafter collectively called stations, have been used to generate data corresponding to a transit graph. The graph includes nodes which each represent a point in space-time at which an event occurs at a particular station, for example an arrival time or a departure time. Arcs joining the nodes represent paths along which the traveller can pass so that a route can be planned in terms of feasible arcs between the nodes.

Thus, by performing a query on the transit graph data, a route can be planned to provide step by step directions to reach a particular destination, using one or more forms of public transportation. The query may be performed on the transit graph data itself or on pre-computed transfer patterns for routes between particular start and end destinations, the pre-computation being performed so as to reduce the data processing required at the time that a user makes a query, for example as described in US 2011/0112759 A1.

However, not all the scheduling information for public transport systems is published in a form that can conveniently incorporated into the transit graph data, which as discussed above, provides nodes for events at defined times at the stations, for example a train arrival or departure time. In contrast, some public transport systems define their service provision in terms of a start time of day when the service starts, and end time of day when the service finishes and a repeat schedule for which successive vehicle journeys from a particular station are separated by a common time period (P). For example, the published scheduling information may specify that trains start from a particular station at 06:00 hrs., finish at 23:00 hrs. and are provided nominally every 10 minutes, although in practice the time period may change for successive trains from the nominal period P due to operational service variables.

SUMMARY

In the embodiments of the invention described hereinafter, such repeat schedule information is incorporated into the transit graph data and a route planning query can be performed in which uncertainties of waiting times for vehicles operating in accordance with a repeat schedule can be suitably accommodated.

In one embodiment, a computer implemented method includes defining nodes in the transit graph data that simulate individual times of the day for which vehicles may stop at a first of the stations according to a repeat schedule in which successive vehicle journeys from the first station are separated by a common time period (P), the simulated individual times of the day for the respective nodes for the repeat schedule being separated successively by a period less than or equal to the common time period (P), performing a query computation in respect of the transit graph data to determine a journey schedule for a route between a target station and a destination station, and if the route extends through the first station and involves travel according to the repeat schedule, defining for the route that the journey time includes a waiting time period at the first station not less than the common time period (P).

BRIEF DESCRIPTION OF THE DRAWINGS

In order that the invention may be more fully understood, an embodiment thereof will now be described by way of illustrative example with reference to the accompanying drawings, in which.

DETAILED DESCRIPTION

Overview

Figure 1:
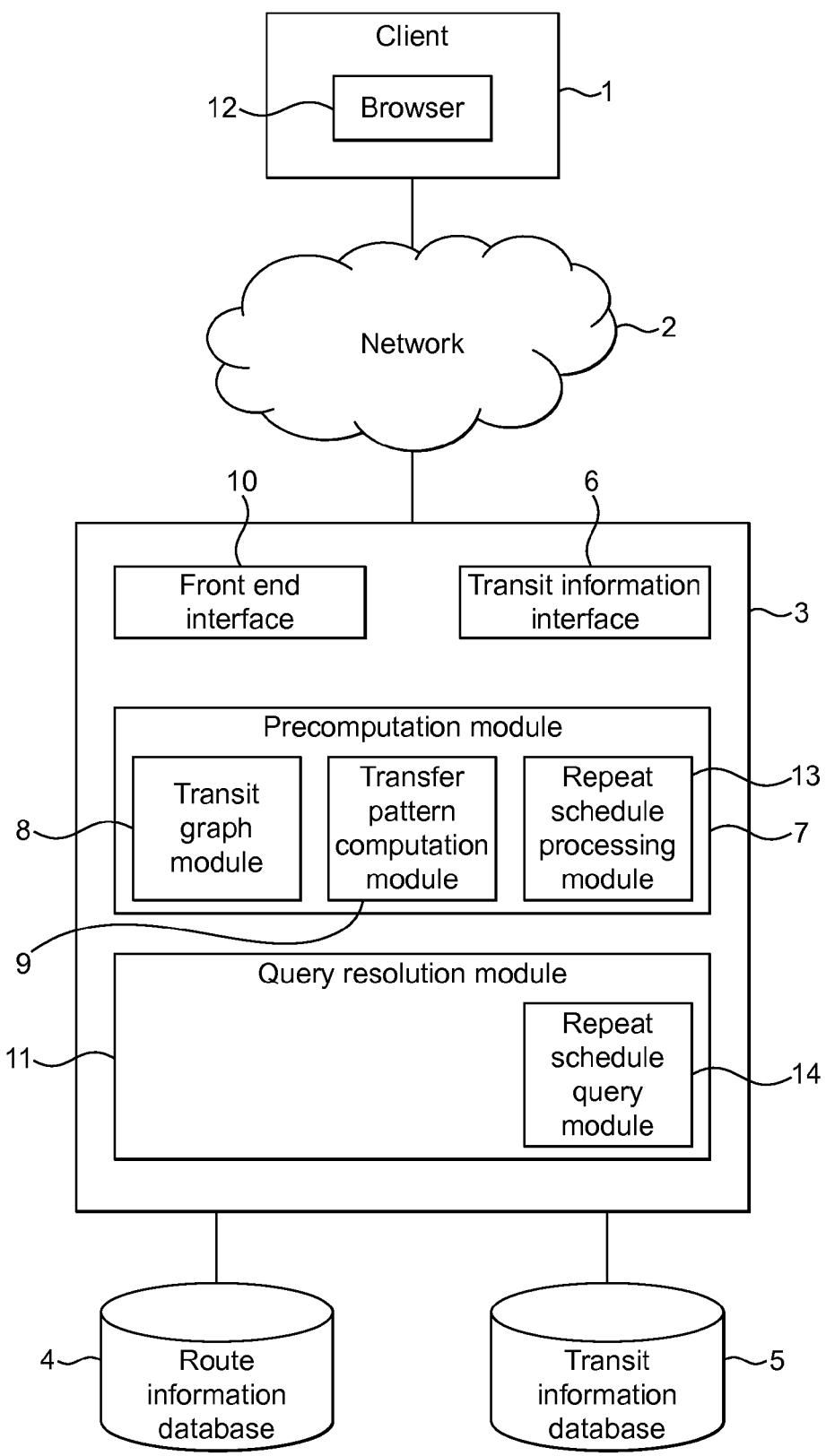
FIG. 1 is a schematic block diagram of a route planning system.

FIG. 1 is a block diagram of public transport journey solution in which a user may use a client device 1 connected through a network 2 to a transit server 3 which is provided with a route information database 4 and a transit database information 5. The network 2 may comprise any suitable network such as the Internet or other WAN, a wireless telecommunications network or a LAN, which may be wired or wireless. The client device may comprise a personal computing device, which may be portable or a mobile telecommunications device for example with Internet functionality.

The transit server 3 is configured to respond to queries from a user client 1 to provide route planning information to the user in response to a query for an optimum route between a user defined start or target destination and a user defined end destination, for example for a particular start time or arrival time.

As shown in FIG. 1, the transit server 3 comprises a number of processing modules. It will be appreciated that the term "module" refers to computer logic utilised to provide specified functionality. Thus, a module can be implemented in hardware, firmware and/or software controlling a general purpose processor. In one embodiment, the modules are program code files stored on a storage device, loaded into memory and executed by a processor or can be provided from computer program products, for example computer executable instructions, that are stored in a tangible computer-readable storage medium such as RAM hard disk or optical or magnetic media.

Also, it will be appreciated that embodiments of the server 3 can have different or other modules to the ones described herein, with the described functionalities distributed amongst the modules in a different manner.

Precomputation-Transit Graph Preparation

Referring to FIG. 1, the transit server 3 is configured to develop data corresponding to a transit graph to be described in more detail hereinafter and to this end, the server includes a transit information interface 6 which receives transport schedule information as published by different public transportation service providers such as rail transport systems providers, bus companies and the like. In one example, each agency providing such schedule information is in communication with the transit server 3 to provide the scheduling information in a specified format such as the Google transit feed specification (GTFS) described at http://code.google.com/transit/spec/transit_feed_specification.html. The transit information received includes public transportation schedules describing calendar dates when a public transport vehicle makes a particular trip and station information e.g. the address describing stations where stops are made along the trip. Other attributes of the trip may include the monetary cost and the times where stops are made at different stations along a particular route.

The received transit information is stored in a transit information database 5 from the different information sources. For example, the database 5 may store bus schedule information from a public bus system, train schedule information for local commuter trains, long distance trains and subway schedules for a subway system. Other scheduling information will also be evident to those skilled in the art.

The data stored in the transit information database 5 is stored in terms of a transit graph which is prepared by a pre-computation module 7, which includes a transit graph module 8 and also a transfer pattern computation module 9 to be described hereinafter.

For each arrival and/or departure of the vehicle at a station, the transit graph module 8 inserts nodes into a transit graph in which one axis represents the distance between stations and another axis represents the passage of time. Typically two nodes are inserted representing respectively an arrival event and a departure event, at the respective times of day. Thus, if a vehicle does not arrive/depart at a station, no node is created at this station since no departure or arrival event occurs at this station. Since nodes in the transit graph are generated from the specified scheduling information received by the interface 6, each node is associated with a vehicle at a station at a specific time. A node in the transit graph can be a station node or an onboard node. A station node represents a vehicle at a station that a user can board in order to make a trip. In contrast, an onboard node represents a public transit vehicle on which a user is currently boarded that is located at the station associated with the node. Nodes in the transit graph are connected to one another by arcs that describe the route of a trip. In the examples described herein, there are four types of arcs: boarding arcs describing a vehicle being boarded at a station, alighting arcs describing a vehicle being exited at a station with optional walking if a person should walk to another station to board a transit vehicle to complete a journey, waiting arcs describing a person waiting at a transit station, and transit arcs describing staying onboard a vehicle between two stops of a trip.

As mentioned above, the transit graph module 8 analyzes the schedule information received through the interface 6 to determine the events taking place at individual stations. Based on the event, the transit graph module 8 places a corresponding node (either station or onboard) in the transit graph and connects the nodes with arcs. The type of arc connecting two nodes is based upon whether the nodes being connected are station or onboard nodes. For example, if the transit information describes that a vehicle is boarded at station A and travels to station B without a transfer, the transit graph module 8 includes a station node associated with station A in the transit graph and includes an onboard node associated with station B in the transit graph. Thus, the arc connecting the nodes is a boarding arc. In another example, if an onboard node is connected to a station node, the arc connecting the nodes is a boarding arc.

Figure 2:
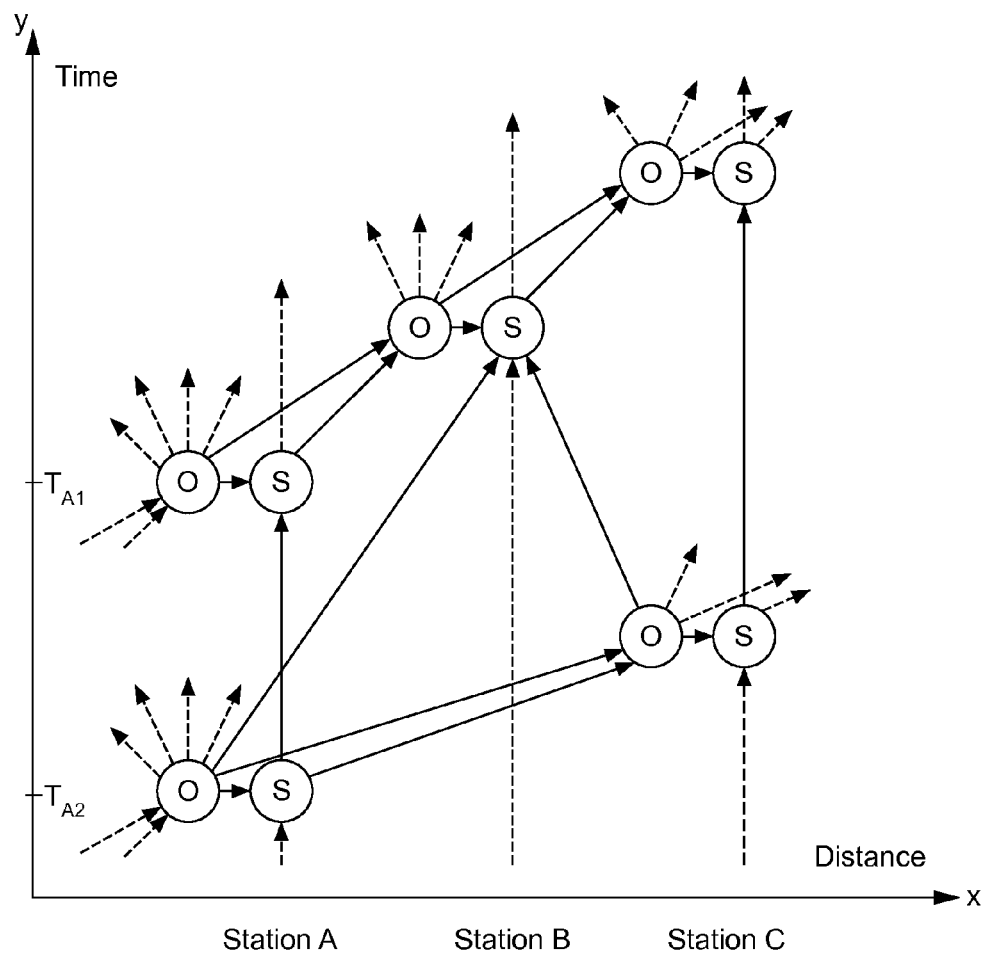
FIG. 2 is an illustrative example of a transit graph.

One example of a portion of a transit graph is illustrated in FIG. 2. The Y-axis of the transit graph represents time and the X-axis represents stations A, B, C . . . . It will be appreciated that the X and Y axes here are illustrated as a convenient way to explain the use of the transit graph data, and in actual practice the transit graph data stored in the database 5 does not include an X or Y axis, nor are the nodes of the graph arranged in a spatial manner as shown in FIG. 2.

In this illustration, the Y-axis is a time representation of a single day and for each station S represented on the X-axis, the transit graph module 8 adds a series of nodes to the transit graph, which are arrayed along the Y-axis. Each node in the series associated with a station represents a transit event that occurs at the station at the particular time associated with the node.

As shown in the transit graph, stations A, B, C . . . each include a series of nodes at different time intervals. Nodes labelled with an "S" are station nodes and nodes labelled with an "O" are onboard nodes as previously discussed. Each station node associated with the given station is associated with some event occurring at the station at a particular time. The station nodes S for station A are shown sequentially connected in time, to represent that a person can wait at station A for time period between TA1 and TA2.

For a further, more detailed description of transit graphs, reference is directed to US 2011/0112759 A1 which is incorporated herein by reference.

Pre-Computation-Transfer Patterns

Typically, the transit graph data created and stored in the transit information database 5 can comprise arcs for a very large number of nodes, for example for stations distributed over an entire continent or a geographical region e.g. North America or Europe and although a route planning query can be made in respect of the transit graph data, a significant processing time may be involved. To overcome this difficulty, the pre-computation module 7 illustrated in FIG. 1 includes the transfer pattern computation module 9 which is operable to define and pre-compute feasible routes between stations for which the nodes have been stored in a transit information database 5 i.e. pre-computed before a route planning query is carried out. Reference is directed to US 2011/0112759 for a fuller explanation, the contents whereof are incorporated herein by reference.

The feasible routes are computed by performing a search between nodes and along arcs for start and destination stations for a particular journey, by seeking the least cost route along the arcs defined in the transit data database 5 between the nodes. The search may be performed with a suitable search algorithm such as the Dijkstra search algorithm.

As explained in US 2011/0112759, supra, each node may be tagged with a multi-dimensional cost parameter label for items such as journey duration walking between nodes etc. so that a path of least cost can be computed between the start or target node and the destination node. For a particular target and destination node, the optimal transfer patterns between them are computed over a particular time range e.g. 1 day, 1 week or the like and the resulting transfer patterns are stored in the route information database shown in FIG. 4.

The pre-computation of the transfer patterns is performed for at least the major set of pre-defined start-destination pairs of nodes stored in the transit information database 5.

Figure 3:
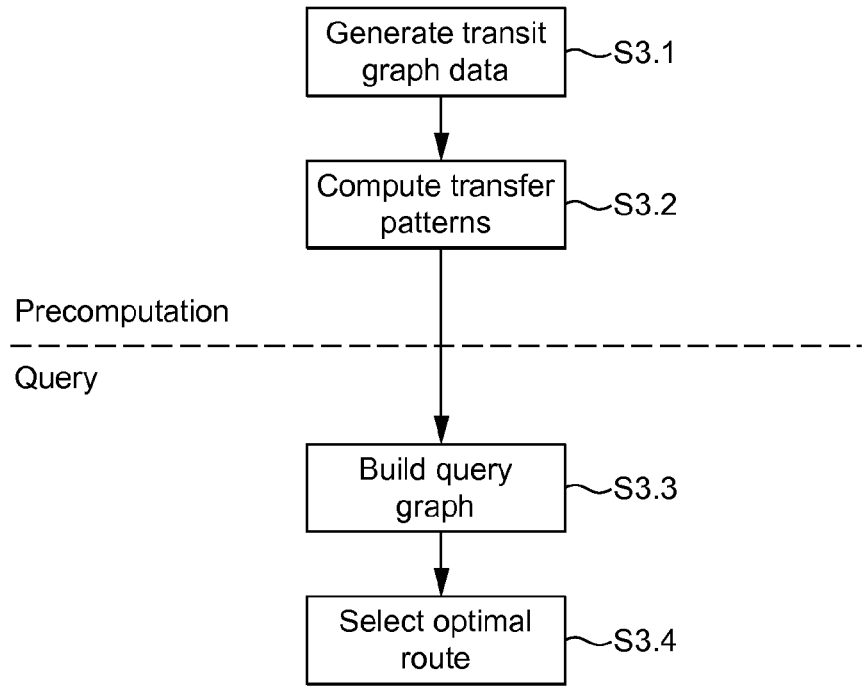
FIG. 3 is a schematic flow diagram illustrating the creation of transit graph data and transfer patterns by a pre-computation module shown in FIG. 1, and also the formation of a query graph in response to a user query so as to select an optimal route.

The pre-computation process is illustrated schematically in FIG. 3. At step S3.1, the transit graph module 8 of the pre-computation module 7 computes the transit graph data, which is stored in the transit information database 5 shown in FIG. 1.

At step S3.2, the transfer pattern computation module 9 computes the transfer patterns over a given time period between a plurality of different start and destination nodes as described above and stores the resulting transfer pattern data in the route information database 4.

Queries

When a user wishes to plan a journey using the system, they may utilise client 1 to send a query through network 2 to a front end interface 10 which supplies the query to a query resolution module 11 which interrogates the transfer pattern data stored in the route information database 4.

The user may use browser 12 running on client 1 to define a target location at which the journey is to commence along with the destination station and a start time of day for the journey. For simplicity in this example the target location is a station which is referred to herein as the target station but it will be appreciated that the target location can be any other suitable map location. This information is communicated to the query resolution module 11, which then builds a query graph from the transfer patterns stored in database 4 in respect of the user defined target and destination stations. This is illustrated at step S3.3 in FIG. 3.

The query is then run on the data of the query graph at step S3.4 in order to select the optimal route between the target and destination stations.

Figure 4:
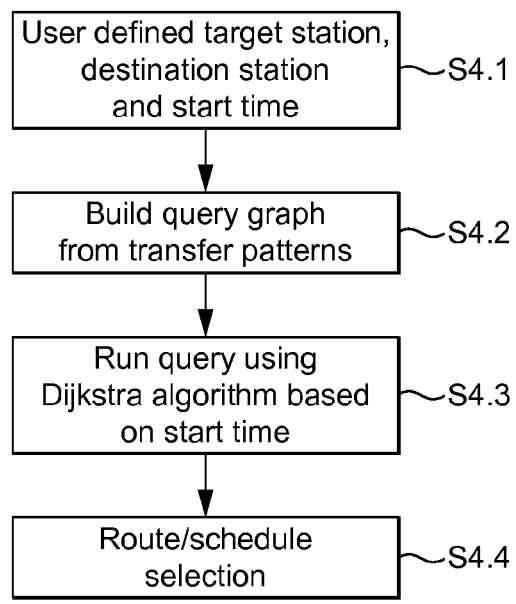
FIG. 4 is a flow diagram illustrating the performance of the query.

Referring to FIG. 4, in step S4.1, the user utilises browser 12 of client 1 (FIG. 1) to define a query that includes a target station, destination station and a start time for the journey. Alternatively, an arrival time may be defined. The query is transmitted to the query resolution module 11 as shown in FIG. 1, which builds a query graph from the transfer patterns as illustrated in step S4.2.

From the foregoing, it will be appreciated that the query graph that is specific to the defined start and destination stations at the defined time may include a number of feasible routes defined by the arcs extending between candidate nodes situated between the target and destination nodes.

Then, at step S4.3, the query resolution module 11 runs a query using a suitable search algorithm, based on the defined start time to identify one or more routes of least cost, so as to select a route and associated schedule as illustrated at step S4.4. Any suitable search algorithm may be used and by way of illustrative example, the use of a Dijkstra algorithm will be described hereinafter, although other algorithms of similar functionality will be evident to those skilled in the art.

The resulting data is then transmitted by the server 3 through the front end interface 10 and network 2 to the client 1 so as to be presented on browser 12 to the user. The route/schedule is displayed in terms of the stations to be utilised for the selected route, along with details of any transfers or transit required between different train or bus lines and the associated times.

Repeat Schedule Information

It will be seen from the foregoing that the transit graph data produced by module 8 from the schedule information received by the transit information interface 6 shown in FIG. 1, involves placing onboard and station nodes O, S in the transit graph shown in FIG. 2. For conventional railway and other timetables, this can be computed in terms of the arrival and departure times for vehicles that are specified in the timetables published by transport service providers.

However, not all the scheduling information for public transport systems is published in a form that can be conveniently incorporated into the transit graph data. Some public transport systems define their service provision in terms of a start time of day when the service starts and an end time of day when the service finishes, together with a repeat schedule for which successive vehicle journeys from a particular station are separated by a common time period e.g. a bus may be scheduled to arrive at a bus stop every 10 minutes between 06:00 hours and 23:00 hours. However, there is an uncertainty with repeat scheduling as to when vehicles will actually arrive at stations, due to traffic etc., and so the common period P may vary somewhat for each successive vehicle.

Referring to FIG. 1, the pre-computation module 7 includes a repeat schedule processing module 13 which processes repeat schedule information that is received by the transit information interface 6 from publicly available scheduling sources, as previously described. The repeat schedule processing module 13 performs a process illustrated schematically in FIG. 5 to enable data for the repeat schedule to be included into the transit graph data stored in the transit information database 5.

The process starts at step S5.1 in which the schedule information is analysed to determine whether a repeat schedule applies for a particular station $S_n$, as indicated at step S5.2. If not, the next station $S_n+1$ is processed as indicated at step S5.3.

If the repeat schedule does apply for station $S_n$, the published schedule data received by the transit information interface 6 is reviewed so as to get a start time T1 and end time T2 and the common repeat period P for the schedule. For example, the published scheduling information may specify that a vehicle service such as a train service starts from a particular station at start time T1=06:00 hours and finishes at end time T2=23:00 hours and vehicles for passenger travel are provided at every P=10 minutes.

Then, step S5.5, nodes are created to approximate station nodes corresponding to the departure for each vehicle from the station concerned during the period between the start time T1 and end time T2 of the repeat schedule service provision. It will be appreciated that these nodes do not provide a precise definition of the various departure times for vehicles from the stations concerned, due to the nature of the repeat schedule information but, as will be explained hereinafter, this uncertainty is accommodated and overcome in the route planning system. In more detail, station nodes are created at times T1, T2−P and at successive intervals ≤P between them. The resulting station nodes are then stored in the transit graph database in respect of the station concerned. The repeat scheduling processing module 13 may also compute onboard nodes for the stations which are also stored in the transit graph database although this has been omitted from the explanation for purposes of clarity.

Figure 5:
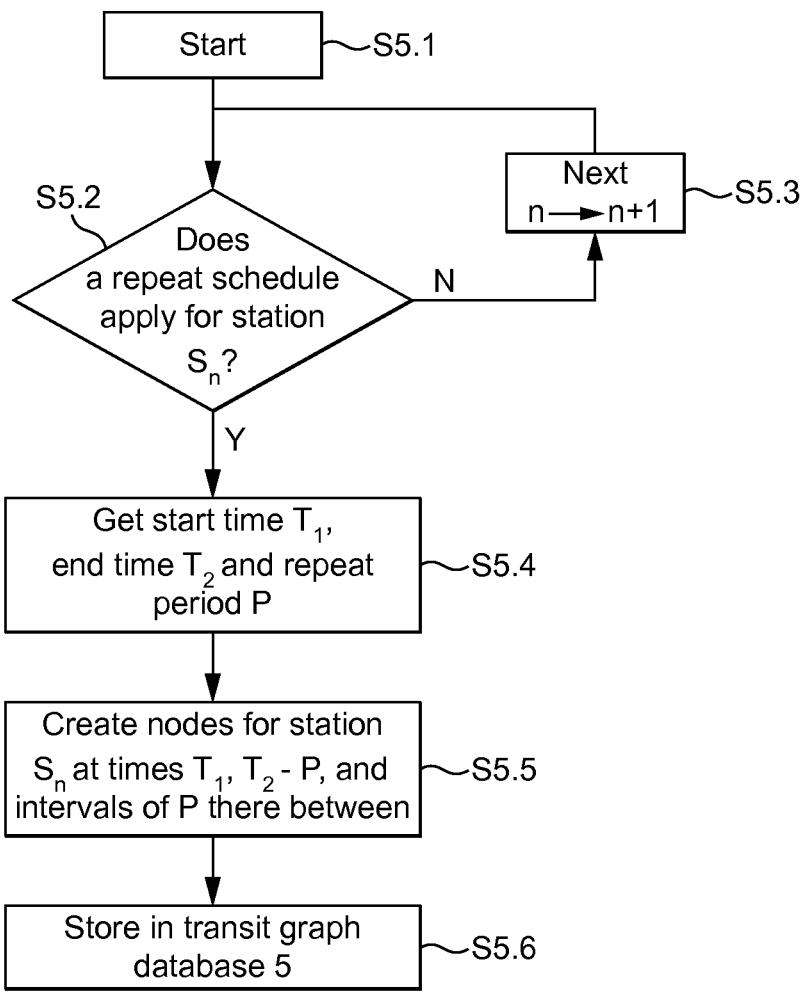
FIG. 5 is a schematic diagram of pre-computation of nodes for published transport schedules that utilise a repeat schedule of period P.

It will be understood that the artificial nodes for the repeat schedule created by the process illustrated in FIG. 5 will thereafter be incorporated into the transfer patterns computed by the transit graph module 8 such that the route information database 4 contains transfer patterns which include the nodes created for the repeat schedule.

These artificial repeat schedule nodes will also be included in the query graphs produced at query time as described with reference to FIG. 4.

Query Time for Repeat Schedule

For services that run according to the repeat schedule, when a traveller arrives at a particular station, there is uncertainty as to how long the traveller will need to wait until arrival of the next vehicle. It will be appreciated that the process described with reference to FIG. 5 creates artificial station nodes which may not reflect the actual times which vehicles arrive and depart from particular stations, introducing an uncertainty as to the actual waiting time required. In the query process, shown in FIG. 6, a waiting time W for a traveller is forced to be not less than P in order to ensure that the worst case scenario is modeled in the query, namely that the traveller has just missed the last vehicle and has to wait a full repeat period P.

Thus, for a journey that involves a repeat schedule from station A starting at time T, the logical response of the planning system is:

(1) If T+P<T1, depart from A at T1, because the waiting time W=T1−T is greater than P.

(2) If T1≤T+P≤T2, depart from A at T+P i.e. the waiting time W is set to be equal to P.

(3) If T2<T+P, there is no possible connection.

Figure 6:
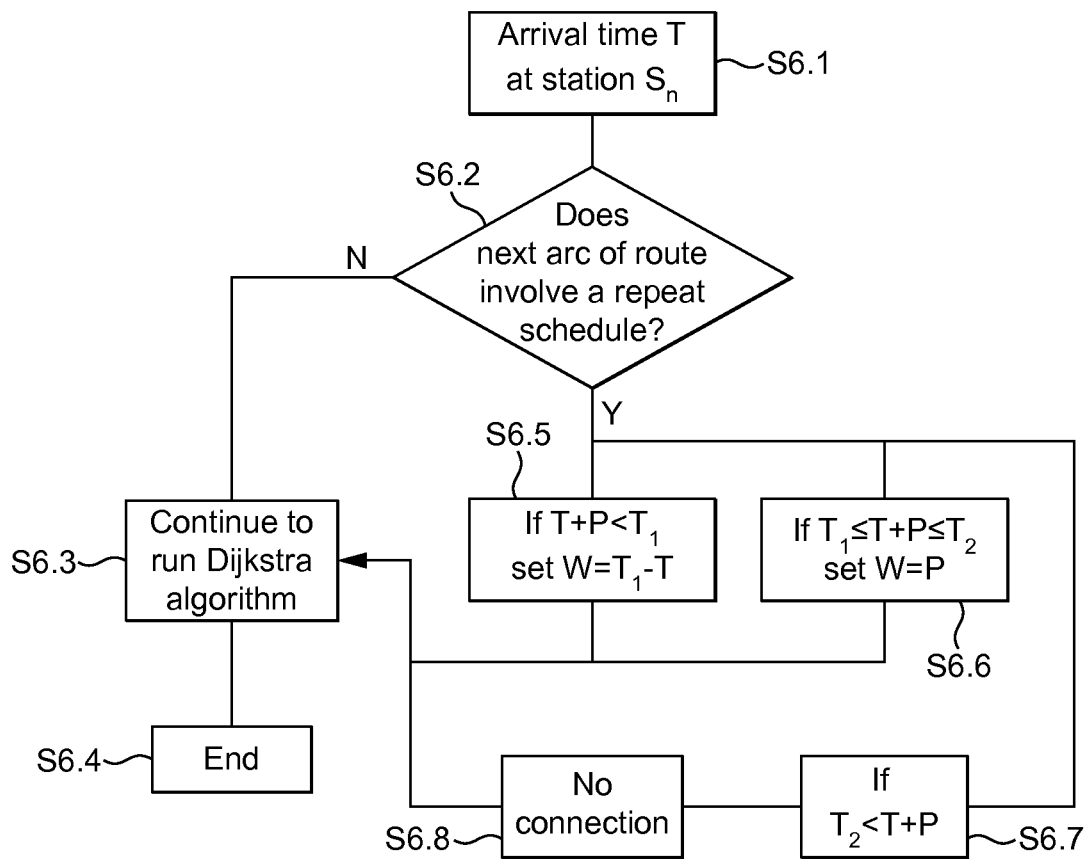
FIG. 6 illustrates a process performed by the query module for a station where a repeat schedule arises.

Referring to FIG. 6, at query time, the process described with reference to FIG. 4 will be run and additionally when the Dijkstra algorithm encounters and searches paths including the nodes which correspond to an arrival time T station $S_n$ which involves a repeat schedule, additional methodology is performed in accordance with the process of FIG. 6. The process starts at step S6.1 and, at step S6.2, if the next arc of the route under consideration in the Dijkstra algorithm involves a vehicle operating according to a repeat schedule, additional measures are carried out to compensate for the uncertainty of the waiting time, so as to force the waiting time W to be not less than the period P between successive vehicles.

In more detail, if the relevant arc for station $S_n$ does not involve a repeat schedule, the Dijkstra algorithm continues to run as described with reference to FIG. 4 to achieve a route planning outcome at step S6.4, which corresponds to the route schedule selection selected at step S4.4.

However, if the arc does involve a repeat schedule, the conditions (1), (2) and (3) described above are tested.

Thus, at step S6.5, if the traveller were to arrive at the station prior to the commencement of the repeat schedule at time T1, the time needed to wait for a train will be the difference between the start time of the repeat schedule and the actual time of arrival. This waiting time W is fed into the Dijkstra algorithm computation performed at step S6.3.

However, if the arrival time T of the traveller is between the start and end times T1, T2 the waiting time W is set to be equal to P so as to model the worst case scenario that the traveller has to wait a full repeat period P before the next vehicle arrives. Again, the value of W is supplied to the search process performed using the Dijkstra algorithm at step S6.3 to ensure an appropriate modeling of the waiting time in the route planning process. At step S6.7, if the arrival time T is less than the period P before the end time of the repeat schedule T2, there is a risk a vehicle will not be available for transport and so at step 6.8, the route option is rejected for consideration by the Dijkstra algorithm search and thereby excluded by the route planning options presented in answer to the query.

In a modification, the user defined query specifies an arrival time rather than a start time for the journey. The process described above can also be used for such a query because the conditions (1), (2) and (3) will work equally well when working backwards from a user defined arrival time in a query on the query graphs produced as described herein.

Many modifications and variations of the embodiments of the invention described herein are possible within the scope of the claims hereinafter. Furthermore the particular the naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, the reference to these arrangements of operations in terms of modules should not be considered to imply a structural limitation and references to functional names is by way of illustration and does not infer a loss of generality.

Unless specifically stated otherwise as apparent from the description above, it is appreciated that throughout the description, discussions utilising terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be understood that the process steps, instructions, of the present invention as described and claimed, are executed by computer hardware operating under program control, and not mental steps performed by a human. Similarly, all of the types of data described and claimed are stored in a computer readable storage medium operated by a computer system, and are not simply disembodied abstract ideas.

The present invention also relates to an apparatus for performing the operations herein. This apparatus may be specially constructed for the required purposes, or it may comprise a general-purpose computer selectively activated or reconfigured by a computer program stored on a computer readable medium that can be executed by the computer. Such a computer program are stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein can be executed by any type or brand of computer or other apparatus.

Various general-purpose systems may also be used with programs in accordance with the teachings herein, or it may prove convenient to construct more specialized apparatus to perform the described method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided by way of illustrative example.

What is claimed is:

1. A computer implemented method for public transportation journey planning comprising:
   providing, by one or more computing devices, transit graph data with nodes that correspond to stations for vehicles and the times of the day at which the vehicles stop at the stations;
   defining, by the one or more computing devices, nodes in the transit graph data that simulate individual times of the day for which vehicles may stop at a first of the stations according to a repeat schedule in which successive vehicle journeys from the first station are separated by a common time period (P), the simulated individual times of the day for the respective nodes for the repeat schedule being separated successively by a period less than or equal to the common time period (P) and wherein the repeat schedule runs at the first station from a start time of the day (T1) until an end time of the day (T2) such that nodes in the transit graph data are defined at times T1, T2–P and at additional times in successive intervals ≤P between T1 and T2–P;
   performing, by the one or more computing devices, a query computation in respect of the transit graph data to determine a journey schedule for a route between a target station and a destination station; and
   if the route extends through the first station and involves travel according to the repeat schedule, defining for the route that the journey time includes a waiting time period at the first station not less than the common time period (P), if an arrival time (T) at the first station is predicted to be before the start time of the day (T1) of the repeat schedule by more than said common time period (P), setting a waiting time (W) at the first station to be not less than the difference between the arrival time (T) and the start time of day (T1), and if the arrival time (T) at the first station is predicted to be after a time that corresponds to the end time of day (T2) less the common period (P) of the repeat schedule, rejecting the route as unfeasible.

2. The method of claim 1 including performing a precomputation for a plurality of pairs of stations represented in the transit graph data, to provide at least one transfer pattern that corresponds to at least one feasible route between each respective pair of stations, storing the at least one transfer pattern for the pairs of stations, and performing the query computation on the stored transfer patterns to determine the journey schedule for a route between the target station and the destination station.

3. The method of claim 1 wherein the transit graph data includes data corresponding to the nodes and arcs defining routes between the nodes and the routes are selected by using a least cost search process to determine arcs from a target node to a destination node.

4. The method of claim 3 including using a Dijkstra algorithm.

5. The method of claim 1 including performing a precomputation of scheduling data to provide the transit graph data.

6. A computer program product for public transportation journey planning comprising and computer readable storage medium storing computer executable code operable to:
   provide transit graph data with nodes that correspond to stations for vehicles and the times of the day at which the vehicles stop at the stations;
   define nodes in the transit graph data that simulate individual times of the day for which vehicles may stop at a first of the stations according to a repeat schedule in which successive vehicle journeys from the first station are separated by a common time period (P), the simulated individual times of the day for the respective nodes for the repeat schedule being separated successively by a period less than or equal to the common time period (P) and wherein the repeat schedule runs at the first station from a start time of the day (T1) until an end time of the day (T2) such that nodes in the transit graph data are defined at times T1, T2–P and at additional times in successive intervals ≤P between T1 and T2–P;
   perform a query computation in respect of the transit graph data to determine a journey schedule for a route between a target station and a destination station; and
   if the route extends through the first station and involves travel according to the repeat schedule, to define for the route that the journey time includes a waiting time period at the first station not less than the common time period (P), if an arrival time (T) at the first station is predicted to be before the start time of the day (T1) of the repeat schedule by more than said common time period (P), to set a waiting time (W) at the first station to be not less than the difference between the arrival time (T) and the start time of day (T1), and if the arrival time (T) at the first station is predicted to be after a time that corresponds to the end time of day (T2) less the common period (P) of the repeat schedule, to reject the route as unfeasible.

7. The computer program product of claim 6 including operable to perform a precomputation for a plurality of pairs of stations represented in the transit graph data, to provide at least one transfer pattern that corresponds to at least one feasible route between each respective pair of stations, storing the at least one transfer pattern for the pairs of stations, and performing the query computation on the stored transfer patterns to determine the journey schedule for a route between the target station and the destination station.

8. A system for public transportation journey planning comprising:
   a memory configured to store transit graph data with nodes that correspond to stations for vehicles and the times of the day at which the vehicles stop at the stations;
   a processor configuration to create nodes in the transit graph data that simulate individual times of the day for which vehicles may stop at a first of the stations according to a repeat schedule in which successive vehicle journeys from the first station are separated by a common time period (P), the simulated individual times of the day for the respective nodes for the repeat schedule being separated successively by a period less than or equal to the common time period (P) and wherein the repeat schedule runs at the first station from a start time of the day (T1) until an end time of the day (T2) such that nodes in the transit graph data are defined at times T1, T2–P and at additional times in successive intervals ≤P between T1 and T2–P;

the processor configuration being further operable to perform a query computation in respect of the transit graph data to determine a journey schedule for a route between a target station and a destination station; and if the route extends through the first station and involves travel according to the repeat schedule, to define for the route that the journey time includes a waiting time period at the first station not less than the common time period (P), and if an arrival time (T) at the first station is predicted to be before the start time of the day (T1) of the repeat schedule by more than said common time period (P), to set a waiting time (W) at the first station to be not less than the difference between the arrival time (T) and the start time of day (T1), and if the arrival time (T) at the first station is predicted to be after a time that corresponds to the end time of day (T2) less the common period (P) of the repeat schedule, to reject the route as unfeasible.

9. The system of claim 8 having a front end interface to be connected to a network to permit users to perform route planning operations over the network.

10. The system of claim 8 including an interface to receive vehicle scheduling information for use in preparing the transit graph information.

11. The system of claim 8 including a processor configuration operable to process the scheduling information to provide the transit graph information.

12. The system of claim 11 including a transit information database to store the transit graph information.

13. The system of claim 11 wherein the processor configuration is operable to perform a search on the transit graph information to provide at least one transfer pattern that corresponds to at least one feasible route between respective pairs of stations, and to store the at least one transfer pattern for the pairs of stations.

14. The system of claim 13 wherein the processor configuration operable to process the transit graph information to perform a query computation on the stored transfer patterns to determine the journey schedule for a route between the target station and the destination station.

* * * * *